United States Patent
Evans et al.

(10) Patent No.: US 7,181,005 B2
(45) Date of Patent: Feb. 20, 2007

(54) TELEPHONE INTERFACE CIRCUIT

(75) Inventors: Glen F. Evans, Fanwood, NY (US); Chandru Tiloomal Butani, East Hanover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 601 days.

(21) Appl. No.: 10/689,250

(22) Filed: Oct. 20, 2003

(65) Prior Publication Data

US 2005/0084095 A1   Apr. 21, 2005

(51) Int. Cl.
H04M 3/00 (2006.01)
H04M 1/00 (2006.01)
H04Q 7/20 (2006.01)

(52) U.S. Cl. .................. 379/418; 379/378; 455/462

(58) Field of Classification Search ..............
379/207.04–207.09, 207.16, 211.01, 211.04,
379/252, 256, 372, 377, 378, 418; 455/414.1,
455/417, 462, 465
See application file for complete search history.

(56) References Cited

U.S. PATENT DOCUMENTS

| | | | | |
|---|---|---|---|---|
| 5,926,755 A | * | 7/1999 | Ghisler | ........................ 455/509 |
| 5,956,631 A | * | 9/1999 | Gerszberg et al. | .......... 455/403 |
| 2004/0248593 A1 | * | 12/2004 | Hicks et al. | ................. 455/462 |

* cited by examiner

Primary Examiner—Benny Quoc Tieu

(57) ABSTRACT

An interface circuit that interconnects a terminal device at an extension station with the adjunct port circuit of a telephone of a business communications system (BCS), such as a digital PBX. The interface circuit enables a call diverted to a BCS telephone to be answered at the extension station. The interface circuit receives a ringing control signal from the adjunct port circuit when its BCS telephone is rung on an incoming call. This causes a ringing current source in the interface to apply ringing current to the extension station simultaneously with ringing of the BCS telephone.

20 Claims, 3 Drawing Sheets

TELEPHONE INTERFACE CIRCUIT

FIELD OF THE INVENTION

This invention relates to a telephone interface circuit and in particular to an interface circuit that operationally couples a telephone of a business communication system (BCS), such as a PBX, with a terminal of an extension station. In particular, this invention relates to an interface circuit that couples the adjunct port of a business communication system with an extension station to enable the extension station to receive and serve calls directed to the associated telephone of the business communication system.

Problem

Telephones of business communication systems often have an adjunct port which appears as a jack on the bottom of the business communication system. telephone. Terminals of the adjunct port may be connected by a plug to peripherals devices such as speaker phones to provide the user of the BCS telephone with additional services and facilities. It is known to connect the adjunct port to an interface circuit which, in turn, is connected to an extension station to enable the user of the BCS telephone to receive incoming calls at other locations. This is useful when the extension station is a cordless telephone which enables the user to wander throughout his work area while answering calls directed to his BCS telephone. This is also useful in call center applications where a high volume of calls are received and where it is important that each call be promptly answered rather than be dropped or routed to answering facilities. The provision of an interface circuit interconnecting the BCS telephone with a cordless telephone enables users of the BCS to receive calls directed to their BCS telephone without fear of the call being dropped or routed to answering facilities.

A problem with the prior art interface circuits is that there is a substantial time delay between the initiation of ringing at the BCS telephone and the ringing of the extension station. The reason for this delay is due to the fact the ring signal for the BCS telephone is not applied to the extension station. Instead, the ringing signal applied to the BCS telephone causes a ring control signal to be generated and applied to the interface circuit which, in turn, generates the ring signal that is applied to the extension station. A delay interval within the interface circuit exists that may amount to a few seconds. At a result, ringing may not begin at the extension station until the initiation of the second or third ring cycle at the BCS telephone. As a result, calls can be lost or routed to answering facilities at the call center since the BCS system diverts calls to the answering facilities that are not answered on the first ring. This is undesirable and costly for the users of the call center since dropped calls represent lost revenue and calls directed to the answering facilities require the services of additional personnel who must retrieve the calls from the answering facilities and then attempt to contact the calling party that initiated each such call. All of this represents operational inefficiency and increased expense.

Solution

The foregoing and other problems are solved in accordance with the present invention by the provision of an interface circuit which eliminates delayed ringing of the extension station and enables the extension station to be rung simultaneously with the initiation of ringing at its associated BCS telephone. This is effected by the provision of ring control circuitry within the interface circuit which receives a ring control signal from the adjunct port of the BCS telephone and immediately initiates the operation of ring circuitry internal to the interface circuit to cause the extension station, such as a cordless telephone, to ring. The elimination of a ring delay interval enables the extension station to ring simultaneously with the BCS telephone. This increases the efficiency of the users of the BCS systems since it enables them to receive calls on their extension cordless telephone without fear of the calls being dropped or diverted to answering machine facilities.

Users of the BCS system served by facilities embodying the present invention may perform their duties with greater efficiency since they have the option of remaining at their desks while answering calls on their regular BCS telephone or, alternatively, by using their extension cordless telephones while performing useful services at nearby locations while being assured that calls incoming to their BCS telephone will be extended to their cordless telephone with immediate ringing.

The interface circuit of the present invention is further advantageous in that it includes power generation circuitry that receives power via the adjunct port of the BCS telephone and converts this power to the voltage and current levels required by cordless telephones. This power is extended via a plug and jack arrangement to the cordless telephone. This enables the cordless telephone to be powered from the interface circuit and eliminates the necessity of the base of the cordless telephone to be connected to the conventional 110 volt service. This provides greater latitude in the location and placement of the base of the cordless telephone.

DESCRIPTION OF THE DRAWINGS

The above and other advantages and features of the invention may be better understood by the reading of a detailed description of one possible exemplary embodiment taken in conjunction with the drawings in which.

DETAILED DESCRIPTION

Figure 1:
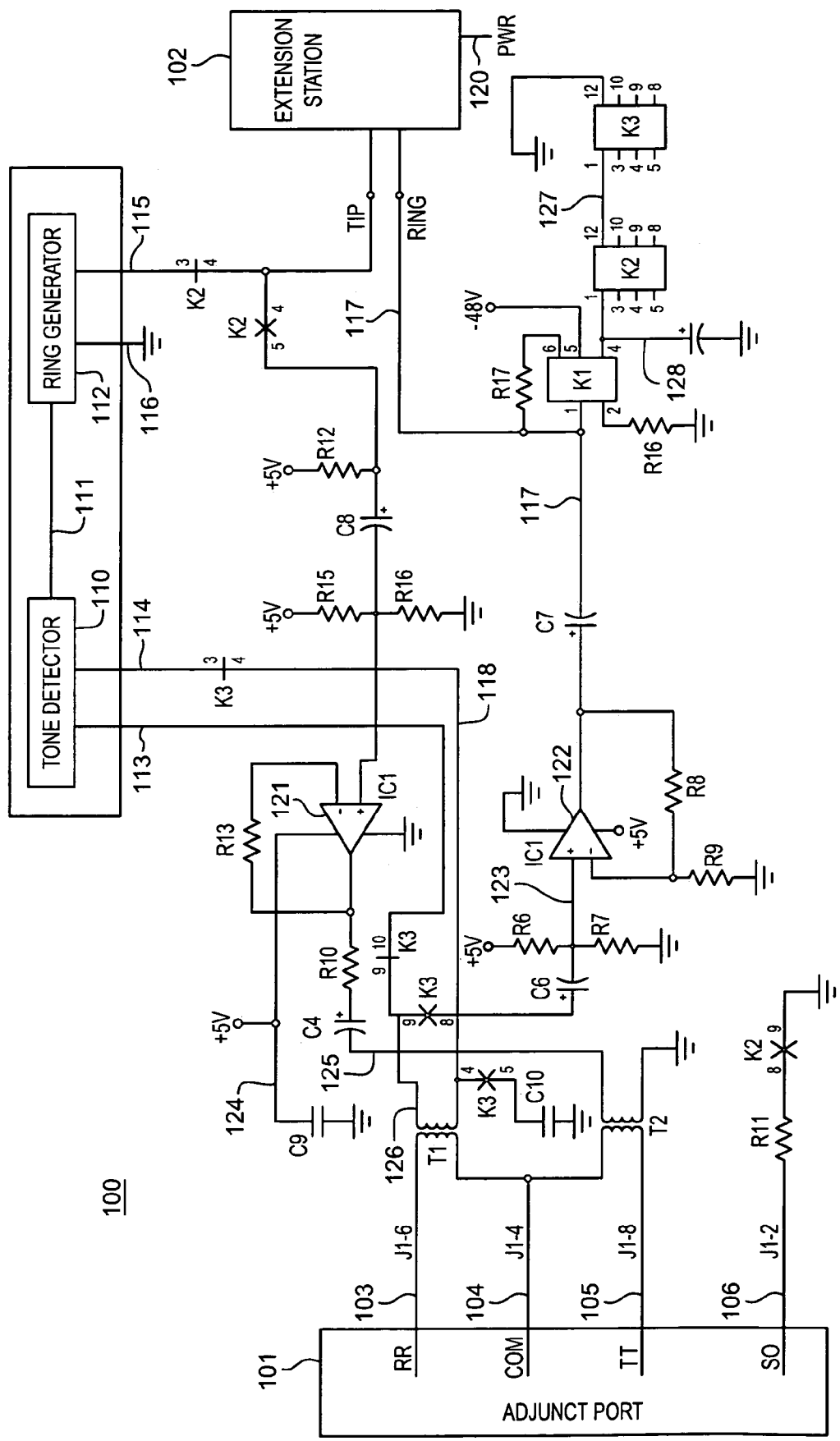
FIG. 1 discloses apparatus embodying the present invention connected between an adjunct circuit and extension station.

FIG. 1 discloses the circuitry of an interface circuit 100 embodying the present invention together with a representation of an adjunct port 101 and a tone detector 110 connected by a path 111 to ring generator 112. The TT and RR conductors 103 and 105 extending from the adjunct port 101 are comparable to conventional tip and ring circuitry and they extend to transformer T1 and T2 respectively. These conductors extend speech signal from the adjunct circuit 101 to the interface circuit 100 and they receive speech signals that originate in extension station 102. COM 104 is a common path. The SO path 106 receives a ground when contacts 8 and 9 of relay K2 operate when the called subscriber at extension station 102 goes off hook. This is subsequently described in detail. Integrated circuit IC1, element 122, receives speech signals from the secondary winding of transformer T1 via make contacts 8 and 9 of relay K3, capacitor C6 and conductor 123 extending to the + input of IC1. The output of 101 extends speech signals through capacitor C7 and path 117 to the ring conductor of extension station 102. Integrated circuit 121 receives speech signals generated by extension station 102 over the tip path, make contacts of relay 5 and 4 of relay K2, capacitor C8 and the + input of integrated circuit 121. The output of integrated circuit 121 is extended through resistor R10, capacitor C4, path 125 to secondary winding of transformer T2 which extends the signals to the adjunct port 101 over path 105.

Relay K1 is an opto isolator and operates when a party at extension station 102 goes off hook. The operation of relay K1 operates relays K2 and K3 over the path beginning at −48V, make contacts 4 and 5 of relay K1, to extend −48V to the terminal 1 side of relay K2. The path continues to the coil of relay K2 to terminal 12 and over path 127 to terminal 1 of relay K3, through the coil of relay K3, to terminal 12 in ground.

In accordance with the present invention, ringing current is applied by ring generator 112 to extension station 102 concurrently with ringing at the associated BCS telephone. The receipt of a call by the BCS telephone immediately rings the telephone of the BCS. The internal circuitry of the BCS telephone including its adjunct port 101 causes a dtmf (dual tone multiple frequency) signal, assigned with ringing, to be applied from the RR lead to the left winding of transformer T1. This signal appears at the secondary winding of transformer T1 and is extended, over path 118, break contacts 3 and 4 of relay K3 which is unoperated at this time, path 114 to one side of the tone detector 110. The other side of the tone detector is connected via path 113, break contacts 9 and 10 of relay K3 to path 126 on the other side of the secondary winding of transformer T1.

Thus, the dtmf signal is applied via paths 113 and 114 to tone detector 110 concurrently with the application of the dtmf signal to path RR of the adjunct port 101. Since the adjunct port 101 applies the dtmf signal to this path concurrently with the application of ringing to the BCS telephone, tone detector 110 is activated to detect the dtmf signal as soon as the BCS telephone begins to ring. The tone detector 110 applies a signal over path 111 to ring generator 112 which immediately applies ringing current to path 115. This ringing current is then extended to extension station 102 over path 115, break contacts 3 and 4 of relay K2, and the tip of extension station 102. The path is extended through the internal circuitry of extension station 102 and loops back to ring conductor 117, through capacitor C7, through resistors R8 and R9 in series to ground. This path applies the ringing current to extension station 102 immediately upon the application of ringing current to the BCS telephone.

Relay K1 remains un-operated during the ringing. When the extension station 102 is answered, the internal impendence of the ringing path decreases. At this time, relay K1 operates and in turn operates relays K2 and K3. Relay K1 operates to ground through resistor R16 at this time and latches in an operated state-for the duration of the call until extension station 102 returns to an on hook state. The path to operate and latch relay K1 includes the ring conductor, the internal circuitry of extension station 102, the tip conductor, and make contacts of 4 and 5 of relay K2, which is now operated, to potential +5V through resistor R12. This path maintains relay K1 in a latch state for the call duration and, in turn, maintains relay K2 and K3 operated.

The operation of relays K2 and K3 disconnects ring generator 112 and tone detector 110 from the transmission path by the opening of break contacts 3 and 4 of relay K2 and 3 and 4 of relay K3. The closure of make contacts 4 and 5 of relay K2 extends the tip conductor of extension station 102 through capacitor C8 to the + input of integrated circuit 121 whose output further extends the signals through resistor R10 and capacitor C4 and conductor 125 to transformer T2 by means of which the signals are extended to the TT conductor 105 of the adjunct port 101.

The operation of relay K2 operates its make contacts 8 and 9 which extend ground through resistor R11 to the SO conductor 106 of the adjunct port 101. This signal notifies the adjunct port that the call has been answered at extension station 102. The adjunct port together with the internal circuitry of the BCS telephone then terminates ringing at the BCS telephone concurrently with the termination of ringing at the extension station 102 when station 102 goes off hook as the call is answered.

The operation of make contacts 4 and 5 of relay K3 extend capacitor C10 to path 118 to apply the proper impendence and capacitance to path 118. The operation of relay K3 when the call is answered closes it make contacts 8 and 9 to extend capacitors C6 to path 126 and transformer T1. This completes a speech path connecting the right side winding of transformer T1 to make contacts 8 and 9 of relay K3 and capacitor C6 and path 123 to the + input of integrated circuit 122. The output of integrated circuit 122 extends the received speech signals through capacitor C7 and path 117 to the ring conductor of station 102. Station 102 now receives speech signals from the BCS telephone via integrated circuit 122 on its ring conductor and can transmit speech signals over the tip conductor, make contacts 4 and 5 of relay K2, capacitor C8, to the + input of integrated circuit 121 whose output is connected signal-wise with path 125 and one side of transformer T2.

Interface circuit 100 of FIG. 1 remains in this state as long as the call remains off hook at station 102. The user at station 102 answers the call immediately when it is received at the BCS telephone since interface circuit 100 operates ring generator 112 so that ringing current is applied to extension station 102 concurrently with the ringing of the associated telephone in the BCS system. The called party at station 102 can converse with the calling party with the same ease and facility as if the call had been answered at the BCS telephone. The call remains in this state as long as the station 102 remains off hook. When station 102 goes on hook at the termination of the call, relay K1 releases and in turn releases relays K2 and K3. The release of these relays opens make contacts 8 and 9 of relay K3, contacts 4 and 5 of relay K3, make contacts 4 and 5 of relay K2 to break the speech path between conductors RR 103 and TT 105 of the adjunct port 101 and the tip and ring conductors of extension station 102. The release of these relays also closes break contacts 3 and 4 of relays K2 and K3 as well as break contacts 9 and 10 of relay K3. This reconnects the tone detector 110 and ring generator 112 to a condition in which they can receive a dtmf ring control signal.

Calls can be initiated at extension station 102. The off hook state of the station upon the initiation of the call operates relay K1 and, in turn, relays K2 and K3. This establishes a voice signaling path through the circuitry of FIG. 1 to interconnect the tip and ring of extension station 102 signal-wise with the RR and TT conductors 103 and 105 in the adjunct port circuit 101. At the same time, the operation of make contacts 8 and 9 of relay K2 extends a ground to the SO conductor 106 of the adjunct port circuit 101 via resistor R11. This ground notifies the adjunct port circuit and its associated BCS telephone that a call is being placed by extension station 102. The circuitry of the BCS telephone is then placed in a condition for it to receive tone signaling generated at extension station 102. This tone signaling is extended via the adjunct port circuit and the BCS which responds and sets up the call specified by the digits represented by the tone signaling to the same extent as if the same call had been initiated at the BCS telephone associated with the adjunct port circuit 101.

Figure 2:
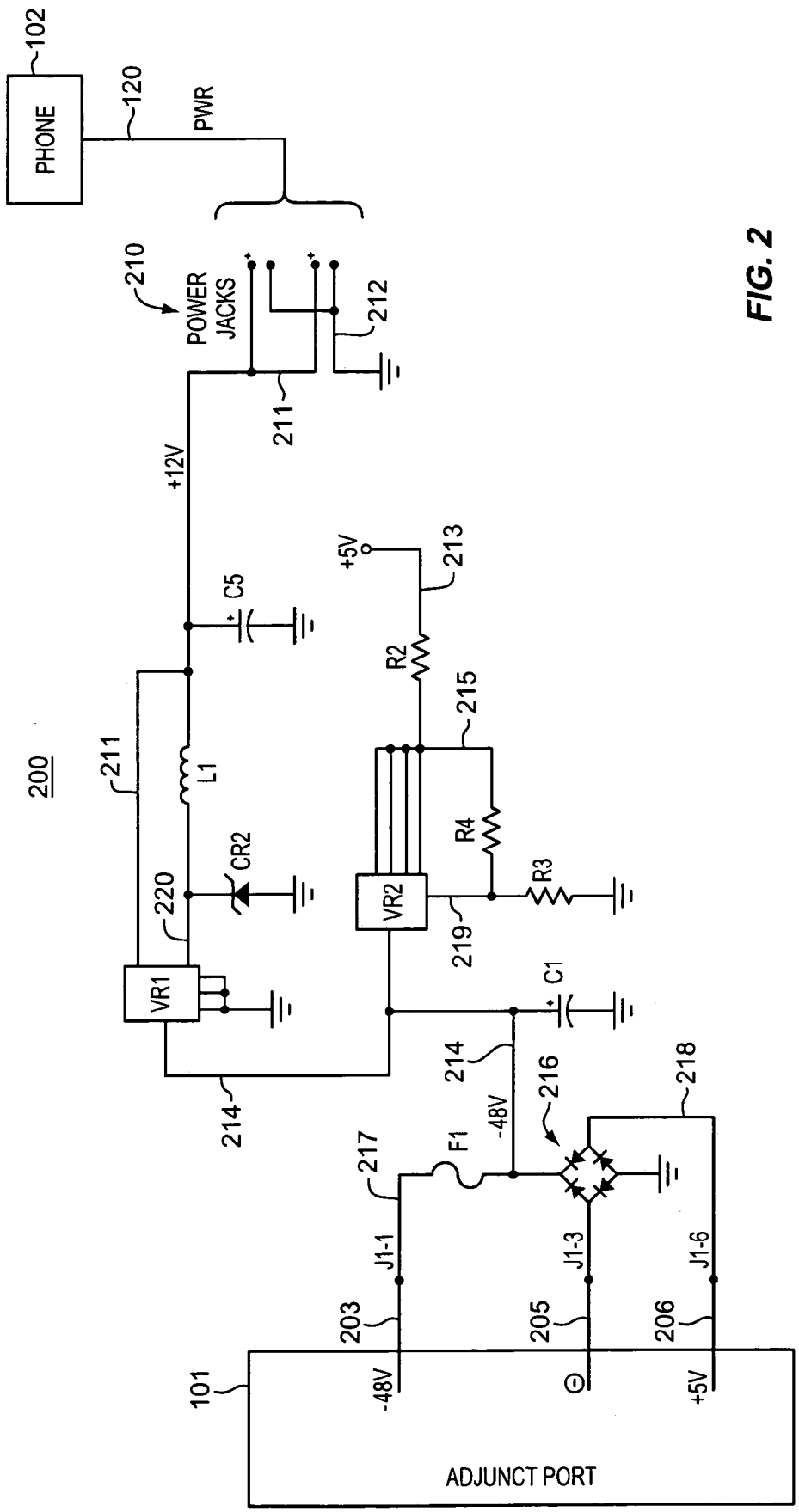
FIG. 2 discloses the power circuitry of the present invention including the power circuitry that supplies power to an extension station.

FIG. 2 discloses the circuitry that receives power from adjunct port 101 converts it to appropriate potentials and extends these potentials as energizing power to extension station 102 to energize it in the event that it is of the cordless type that requires an external power source. The conductors involved in this process are conductors 205(−), 206 (+5V), and 203 (−48V) of the adjunct port 101. The receipt of power over these conductors from adjunct port 101 energizes the full wave rectifier bridge 216 to generate the 48V potential that is applied to capacitor C1 and conductor 214. This −48V potential is applied to voltage regulators VR1 and VR2. Voltage regulator VR2 receives this −48V potential and converts it to a positive potential of +5 volts to supply the indicated plus power to the circuitry of FIG. 1. The reception of the −48V by the regulator VR1 generates a +12 volt potential that is applied to the terminals of power jacks 210. The terminals of power jack 210 supply the appropriate power required by cordless station 102. This permits the user of cordless station 102 to dispense with the use of the typical 110 volt AC power. The circuitry of FIG. 2 is particularly advantageous since it increases the functionality of a typical cordless station by freeing the control base of the cordless telephone from the necessity of a connection to 110 volts. Thus, the base of the cordless telephone can be placed at any convenient location irrespective of whether 110 volts is available. This also makes the cordless telephone useful in periods of emergencies such as power outages when 110 volts might not be available since at that time, in accordance with the present invention, the cordless telephone may be used as part of an emergency circuit or facility to maintain communication during periods of emergency when commercial 110 volt power is not available.

Figure 3:
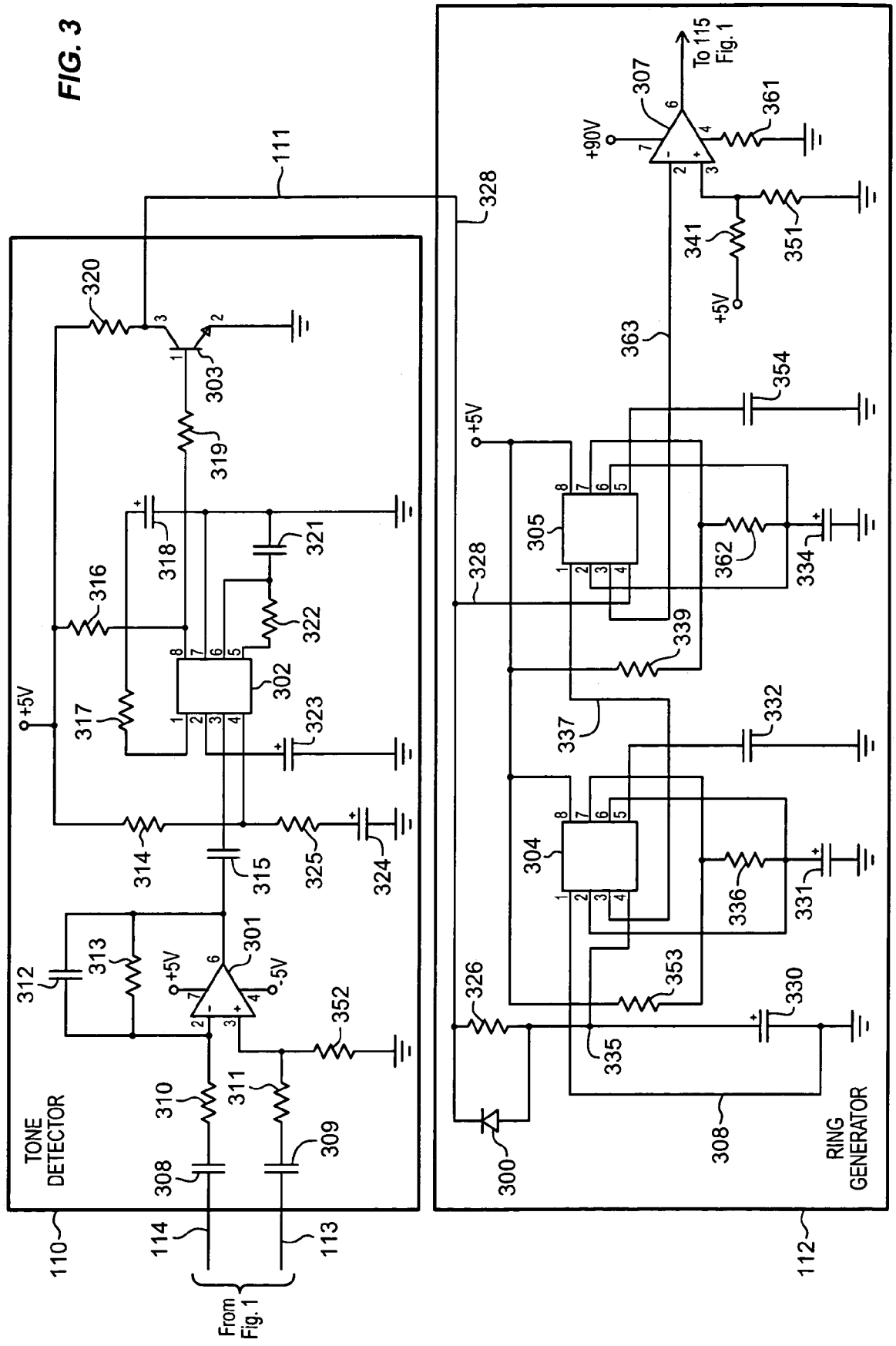
FIG. 3 discloses details of the tone detector and ring control circuit.

FIG. 3 discloses the details of tone detector 110 and ring generator 112 of FIG. 1. Conductors 113 and 114 apply the dtmf ring control signal to tone detector 112 shown in the upper left hand portion of FIG. 3. Conductor 115 extends ringing current from ring generator 112 of FIG. 1 to the tip conductor of station 102 of FIG. 1. Conductor 115 is shown on the lower right hand portion of FIG. 3. This circuitry of FIG. 3 is effective to receive the dtmf ring control signal on conductors 113 and 114 and immediately apply ringing current to conductor 115 simultaneously with the application of ringing current to the associated BCS telephone. The following describes the operation of the circuitry of FIG. 3 in detecting the receipt of the dtmf ringing control signal on path RR 103 and immediately applying a ringing signal to path 115.

The circuit of FIG. 3 is in an idle state when a ringing control signal is not applied on paths 114 and 113. At that time pin 8 of integrated circuit 302 is at a high potential. This high potential is extended through resistor 319 to the base of transistor 303. This high potential holds transistor 303 on in a saturated state. The current through resistor 320 maintains the collector of transistor 303 low at a potential essentially equal to that of the emitter of transistor 303. This low collector potential is extended over paths 111 and 328 to pin 4 of integrated circuit 305. This low potential on path 328 is further extended through the RC circuit of resistor 326 and capacitor 330 whose junction is connected to pin 4 of integrated circuit 304. This low potential maintains capacitor 330 in a discharged state and which maintains pin 4 of integrated circuit 304 at a low potential that holds integrated circuit 304, which is a timer, in an off condition. The circuit of FIG. 3 remains in this state until a ringing control signal is received on paths 113 and 114.

When a ringing control signal is received on paths 113 and 114, it is amplified by op-amp 301 and extended through capacitor 315 to pin 3 of integrated circuit 302. This amplified signal turns on integrated circuit 302. The on state of integrated circuit 302 causes a current through resistor 316 that lowers the potential at pin 8 of integrated circuit 302. This low signal on pin 8 is extended through resistor 319 to the base of transistor 303. This low potential turns transistor 303 off, terminates the current flow through resistor 320 so that the collector of transistor 303 and path 111 switch to a high potential essentially equal to that of the +5 volt power source. This high potential on paths 111 and 328 is extended to pin 4 of timer 305 to turn it on. Integrated circuit 305 is a 20 hertz timer which, when it is on, applies a 20 hertz signal from its pin 3 over path 363 to amplifier 307 which amplifies the 20 Hz signal to a 90 volt ringing signal. This signal is then applied over path 115 to the tip conductor of the extension station 102 via break contacts 3 and 4 on FIG. 1 of relay K2. Paths 111 and 328 remain high and hold timer 305 in an on state for a brief initial interval such as for example 2 seconds. This maintains the ringing signal on path 115 for 2 seconds.

In the mean time, capacitor 330 is initially at a ground potential but begins to charge slowly towards a positive potential through resistor 326 whose top side is connected to the plus potential on paths 328 and 111. Integrated circuit 304 is normally in an off state, but switches to on state when capacitor 330 charges sufficiently. This occurs approximately 2 seconds after the application of the positive signal to paths 328 and 111. The turn on of integrated circuit 304 after a delay of approximately 2 seconds extends a low from pin 3 of integrated circuit 304 to pin 1 of timer 305. The ground on pin 1 of timer 305 turns it off after the 2 second delay controlled by the charging of capacitor 330. The turn off of timer 305 terminates the ringing on path 115 for the duration of time that timer 305 remains off.

Integrated circuit 304 is a timer programmed to have a 2 second on and 4 second off cycle. Timer 304 remains on for approximately 4 seconds, maintains the ground on pin 1 of timer 305 to hold it off and inhibit ringing for the duration of the 4 second interval. Timer 304 switches to off state for 2 seconds at the termination of its initial 4 second on interval. This causes ground to be removed from pin 1 of integrated circuit 305 so that it may turn on for 2 seconds and cause ringing to be applied via amplifier 307 to path 115.

Timers 304 and 305 continue to operate in this manner so that timer 305 is on for 2 seconds and off for 4 seconds. This causes interrupted ringing current to be applied to path 115 in a 2 second on and 4 second off pattern so long as the ringing control signal is applied to paths 113 and 114 in the upper left hand corner of FIG. 3.

Timer 305 turns off whenever its pins 1 and 8 are at the same +5 volt potential and turns on when its pin 8 is at a +5 volt potential but pin 1 but is at a ground potential. An alternating signal appears on pin 3 of timer 304 for 4 seconds followed by a ground potential for 2 seconds. The application of this alternating signal is extended to pin 1 of timer 305 to hold it off for 4 seconds followed by an on for 2 seconds, etc. as long as the ring control signal is applied to conductors 113 and 114 to hold paths 328 and 111 of FIG. 3 high.

The function of diode 300 is to discharge capacitor 330 to ground on the collector of transistor 303 immediately upon the termination of the receipt of the ringing control signal on paths 113 and 114. Diode 300 assures that capacitor 330 is discharged immediately so that FIG. 3 conserves the receipt of a new call immediately upon the termination of ringing for a failed called.

Extension station 102 may be of any type of terminal device or telephone equipped with a trip and ring interface. This would include cordless telephones and conventional telephones. It would also include personal computers and PDAs.

The above description provides one possible exemplary embodiment of this invention. It is expected that those skilled in the art can and will design alternative embodiments that infringe on this invention as set forth in the claims below literally or through the Doctrine of Equivalents.

We claim:

1. An interface circuit adapted to be connected between an adjunct port circuit of a BCS (business communication system) telephone and conductors of an extension station, said adjunct port circuit extends voice and control conductors of said BCS telephone to said interface circuit;
   said interface circuit comprising:
   a detector for receiving a ringing control signal from said adjunct port circuit simultaneously with the initiation of ringing for a call received by said BCS telephone; and
   a ring generator responsive to the receipt of said ringing control signal by said detector for applying ringing current to said extension station simultaneously with the initiation of ringing at said BCS telephone.

2. The interface circuit of claim 1 further comprising:
   sensing apparatus for detecting an off hook signal representing the answering of said call at said extension station; and
   apparatus including said sensing apparatus responsive to said detection of said off hook signal for establishing a voice transmission path within said interface circuit between said adjunct port circuit and said extension station.

3. The interface circuit of claim 2 further comprising:
   apparatus controlled by said sensing apparatus and responsive to said detection of said off hook signal to disconnect said detector and said ring generator from segments of said voice transmission path within said interface circuit.

4. The interface circuit of claim 3 further comprising:
   apparatus responsive to the detection of said off-hook signal for transmitting a signal to said adjunct port circuit indicating that said call has been answered by said extension station.

5. The interface circuit of claim 3 further comprising:
   apparatus including said sensing apparatus for monitoring the off hook state of said extension station for the call duration; and
   apparatus including said sensing apparatus for detecting an on hook state of said extension station at the call termination for interrupting said voice transmission path and for reconnecting said detector and said ring generator to segments of said voice transmission path.

6. The interface circuit of claim 1 further including:
   apparatus responsive to the detection of an off hook condition at said extension station when said BCS telephone is not receiving a call for establishing a voice transmission path through said interface circuit to said adjunct port circuit;
   said adjunct port circuit is adapted to further extend said voice transmission path to the BCS telephone associated with said adjunct port circuit to enable a user at said extension station to initiate a call through said BCS.

7. The interface circuit of claim 5 further including apparatus in said adjunct port circuit for extending a first DC potential to said interface circuit; and
   apparatus in said interface circuit responsive to the reception of said first DC potential for extending a second DC potential to said extension station to operate said extension station as an alternative to the application of external power to said extension station.

8. An interface circuit adapted to be connected between an adjunct port circuit of a BCS (business communication system) telephone and conductors of an extension station, said adjunct port circuit extends voice and control conductors of said BCS telephone to said interface circuit;
   said interface circuit comprising:
   a tone detector connected to segments of a voice transmission path in said interface circuit, said voice transmission path segment extends a ringing control signal to said tone detector from said adjunct port circuit simultaneously with the initiation of ringing for a call received by said BCS telephone; and
   a ring generator responsive to the receipt of said ringing control signal by said tone detector for causing ringing current to be applied to said extension station simultaneously with the initiation of ringing at said BCS telephone.

9. The interface circuit of claim 8 further comprising apparatus for detecting an off hook condition of said extension station when the call represented by said ringing control signal is answered by a user at said extension station;
   apparatus for applying an acknowledgment signal to said adjunct port circuit to terminate ringing at the BCS telephone associated with said adjunct port circuit.

10. The interface circuit of claim 9 further including:
    a sense relay in said interface circuit;
    apparatus-for operating said sense relay in response to said detection of said off hook condition; and
    apparatus responsive to the operation of said sense relay for sending said acknowledgment signal to said adjunct port circuit to terminate the ringing of the BCS telephone associated with said adjunct port circuit.

11. The interface circuit of claim 10 further including apparatus controlled by said sense relay and responsive to the operation of said sense relay to disconnect said tone detector and said ringing generator from said segments of the voice transmission path within said interface circuit;
    an apparatus further responsive to the operation of said sense relay for establishing a voice transmission path through said interface circuit between said adjunct port circuit and said extension station.

12. The interface circuit of claim 8 further including:
    apparatus in said interface circuit operable when said BCS telephone is not receiving a call and responsive to the detection of an off hook condition at said extension station for extending a transmission path through said interface circuit to said adjunct port circuit;
    said adjunct port circuit is adapted to further extend said path to the BCS telephone associated with said adjunct port circuit to enable a user at said extension station to initiate a call through said BCS.

13. A method of operating an interface circuit adapted to be connected between an adjunct port circuit of a BCS (business communication system) telephone and conductors of an extension station, said adjunct port circuit extends voice and control conductors of said BCS telephone to said interface circuit;

said method comprising the steps of:

extending a ringing control signal from said adjunct port circuit to a detector simultaneously with the initiation of ringing for a call received by said BCS telephone; and operating a ring generator responsive to the receipt of said ringing control signal by said detector for causing ringing current to be applied to said extension station simultaneously with the initiation of ringing at said BCS telephone.

14. The method of claim 13 further comprising the steps of:

detecting an off hook signal representing the answering of said call by said extension station; and establishing a voice transmission path in said interface circuit between said adjunct port circuit and said extension station responsive to said detection of said off hook signal.

15. The method of claim 14 further comprising the step of:

disconnecting said detector and said ring generator from said voice transmission path within said interface circuit responsive to said detection of said off hook signal.

16. The interface circuit of claim 15 further comprising the step of:

transmitting a signal to said adjunct port circuit indicating that said call has been answered by said extension station responsive to the detection of said off-hook signal.

17. The method of claim 15 further comprising the steps of:

monitoring the off hook state of said extension station for the call duration;

detecting the on hook state of said extension station at the call termination for disconnecting said voice transmission path and for reconnecting said tone detector and said ring generator to segments of said voice transmission path.

18. The method of claim 17 further including the steps of:

establishing a voice transmission path for a new call through said interface circuit to said adjunct port circuit upon the detection of an off hook condition at said extension station;

extending voice transmission path to the BCS telephone associated with said adjunct port circuit to enable a user at said extension station to initiate a call through said BCS; and transmitting tone signals from said extension station to said BCS telephone to establish said new call.

19. The method of claim 17 further including the steps of extending the a first DC potential to said interface circuit from said adjunct port circuit; and operating apparatus in said interface circuit responsive to the reception of said first DC potential for extending a second DC potential to said extension station to provide power to said extension station.

20. The method of claim 17 characterized in that said step of operating said ring generator includes the steps of:

operating a first timer in said ring generator for applying ringing to said extension for a first ring interval upon the receipt of said ring control signal;

operating a second timer in said ring generator upon the receipt of said ring control signal for causing said first timer to terminate said first ring; and operating said first and second timers to apply further ring signals to said extension station such that each ring interval is followed by a silent interval.

* * * * *